United States Patent
Koster

(10) Patent No.: US 6,542,827 B1
(45) Date of Patent: Apr. 1, 2003

(54) WELL TENDING METHOD AND APPARATUS

(76) Inventor: Wallace C. Koster, 536 E. King St., Chambersburg, PA (US) 17201

( * ) Notice: Subject to any disclaimer, the term of this patent is extended or adjusted under 35 U.S.C. 154(b) by 188 days.

(21) Appl. No.: 09/653,144

(22) Filed: Aug. 31, 2000

(51) Int. Cl.⁷ .............................................. G06F 19/00
(52) U.S. Cl. ........................... 702/22; 702/11; 702/50; 73/31.04; 73/32 R; 73/39.4; 700/75; 700/83; 210/58; 210/97
(58) Field of Search ............................... 73/1.01, 1.16, 73/1.25, 1.26, 1.35, 1.37, 1.57, 1.73, 1.74, 25.03, 30.01, 60, 63, 766, 767, 861; 702/6, 11–12, 22–25, 32–33, 45, 50, 55, 64, 83, 100, 183; 700/1, 9, 19, 67, 69, 75, 83; 340/870.01, 870.03–870.07, 870.16, 870.17, 500, 425.2; 323/234, 304, 355, 369; 210/85, 97, 542, 918; 166/50, 54, 250, 268

(56) References Cited

U.S. PATENT DOCUMENTS

| | | | |
|---|---|---|---|
| 4,395,918 A | 8/1983 | Wilson | 73/861 |
| 4,581,707 A | 4/1986 | Millar | 364/509 |
| 4,795,314 A | 1/1989 | Prybella | 417/43 |
| 5,197,859 A | 3/1993 | Siff | 417/19 |
| 5,316,444 A | 5/1994 | Wicnienski | 417/2 |
| 5,432,709 A | * 7/1995 | Vollweiler et al. | 364/510 |
| 5,460,029 A | 10/1995 | Tuot | 73/3 |
| 5,497,664 A | 3/1996 | Jorritsma | 73/861 |
| 5,509,788 A | 4/1996 | Livingston | 417/43 |
| 5,831,174 A | 11/1998 | Beaudoin | 73/861 |
| 6,021,664 A | * 2/2000 | Granato et al. | 73/53.01 |

* cited by examiner

Primary Examiner—Marc S. Hoff
Assistant Examiner—Elias Desta
(74) Attorney, Agent, or Firm—Kollas and Kennedy; James W. Kollas, Esquire

(57) ABSTRACT

A method and apparatus for monitoring, controlling, recording, and transmitting operational parameters of an aquifer test, municipal well, dewatering project, pump and treat remediation project, or similar activity is presented. Water from a water source, typically a well, is directed through a flow control and monitoring assembly containing sensors to measure well parameters. Sensor readings are sent to a computing device for processing. Discrepancies are detected and operational parameters adjusted to avoid discrepancy-related failures. On-site and off-site personnel interface with the system through a man-machine interface or telephonic communication means, respectively. Performance and efficiency are determined in terms of drawdown, yield, rate of flow, residual drawdown, and specific capacity.

11 Claims, 5 Drawing Sheets

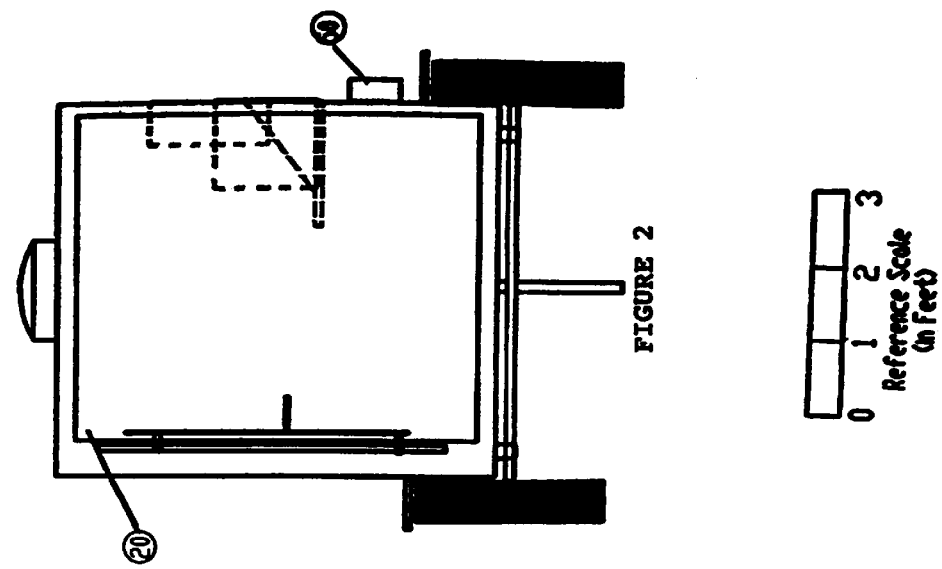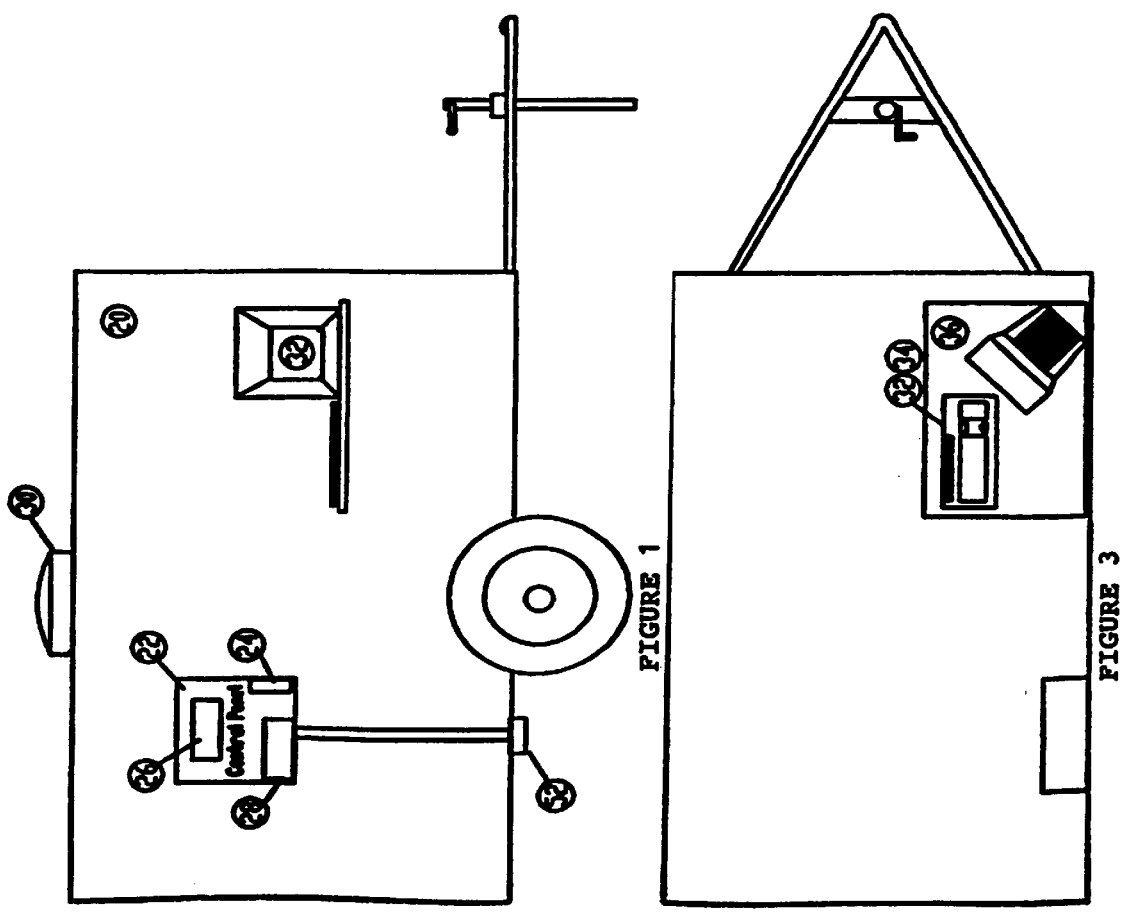

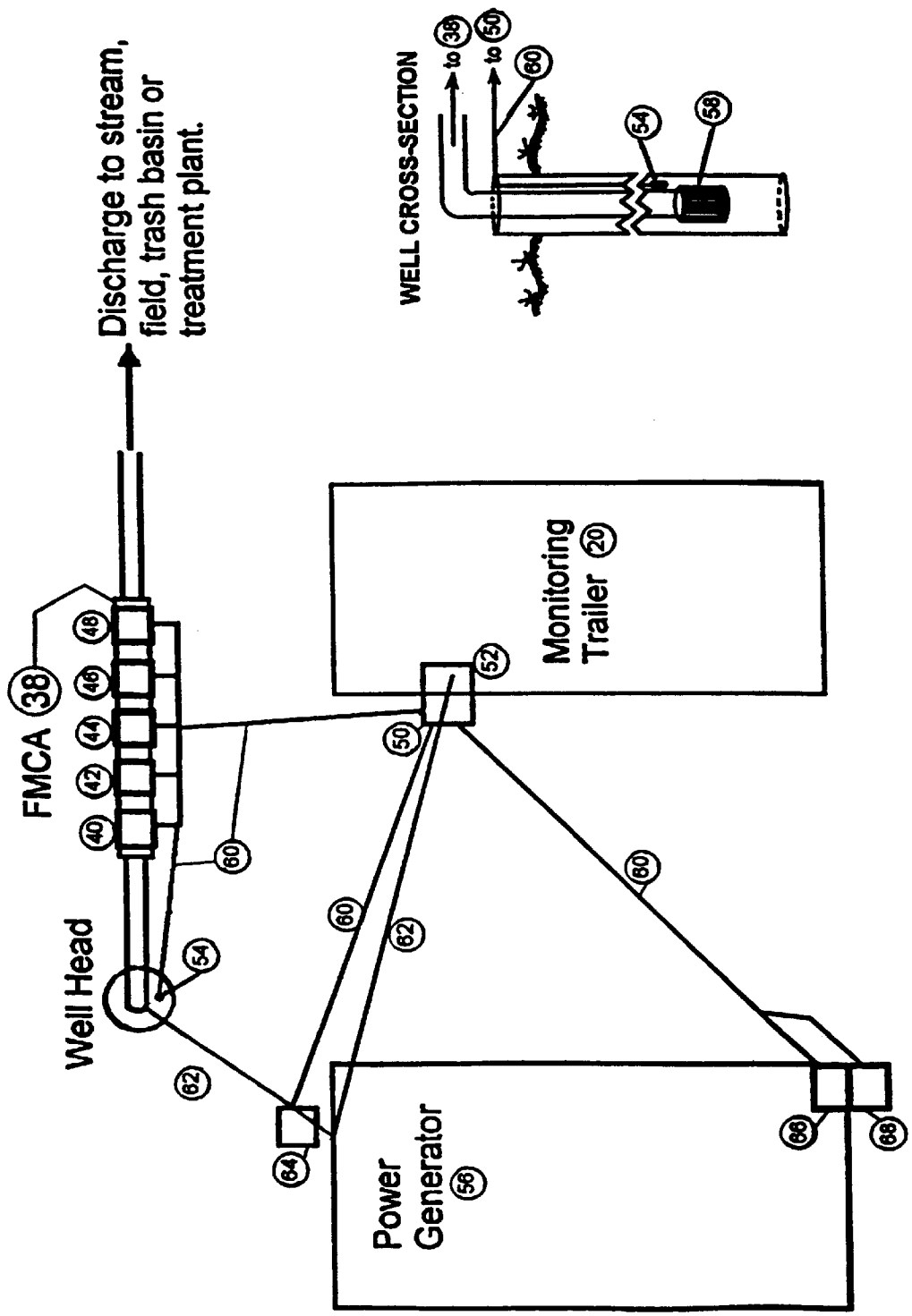
Figure 5A Plan view of the Well Tender in Working Position

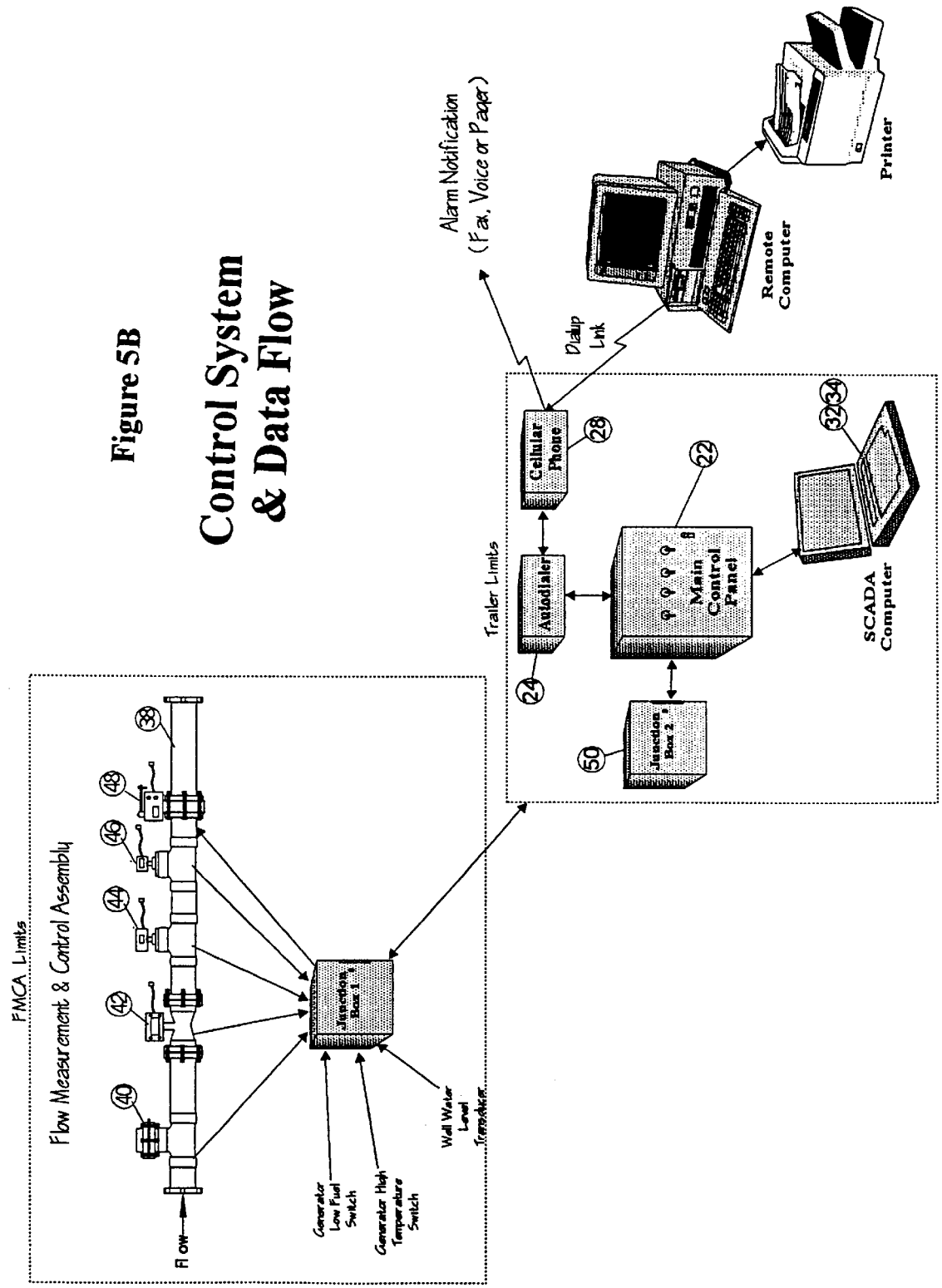

WELL TENDING METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

This invention relates to a method and apparatus, specifically to a method and apparatus used to monitor, control, and manage operational parameters associated with well pumping activities, especially in regard to drawdown and yield of a well or aquifer.

2. Discussion of Prior Art

Water management is important in many fields. Municipalities, agricultural concerns, construction projects, and remediation projects all encounter water management issues. Whether it is testing a new source of water, controlling operational parameters of an operating well, monitoring an excavation site for possible water-related landmass failures, or directing groundwater flow in pump and treat remediation projects, water management plays an important role in modern industry.

Municipalities and agricultural concerns need water in order to function. One of the principal sources of water for municipal and agricultural supply is groundwater via groundwater production wells. In order to test the suitability of these sources of water for use in municipal or agricultural applications, drawdown and yield of the well must be determined. Typically, this is done by controlling the flow of water from the well during an aquifer test.

In an aquifer test, certain parameters need to be considered if the performance of a well is to be determined. These parameters are well-recognized in the prior art and include: Static Water Level, Pumping Water Level, Drawdown, Residual Drawdown, Well Yield, and Specific Capacity. See *Ground Water and Wells, A Reference Book for the Water-Well Industry*, Johnson Division, UOP Inc., p. 81–82 (6th printing 1980).

Static Water Level is the water level in a well before testing or pumping. Pumping Water Level, also known as Dynamic Water Level, is the water level at any point in time while water is pumped from the well. Drawdown is the difference, measured in units of distance, between the water level before testing or pumping and the Pumping Water Level. Residual Drawdown is the difference, measured in units of distance, between the water level before testing or pumping and the water level at any given time after pumping has ceased. Well Yield is the volume of water removed from the well during testing or pumping. Thus, Well Yield is measured in units of volume per units of time. Specific Capacity is the ratio of Well Yield to Drawdown. Therefore, Specific Capacity is measured in units of volume per units of time per units of distance. Well Yield and Specific Capacity test results are used to determine the maximum sustainable water level, performance, and efficiency of a groundwater production well or aquifer.

Aquifer testing is an arduous task. Technical and operating personnel must travel to the location of the source of water. They must set-up numerous pieces of equipment, wasting time and money. After the equipment is finally in place, testing begins and does not stop for periods that range from 12 to 48 hours or longer. During this time, an on-site geological technician oversees the testing. Once the test begins, it continues regardless of inhospitable climatic and environmental working conditions. These conditions often include wind, rain, lightning, snow, sleet, ice, and hail. Furthermore, workers are subject to injury from insects, snakes, and from falls or muscular strains due to standing or walking over uneven and/or slippery ground.

As a result of these inhospitable conditions, data collected during the testing is often "noisy." Instead of watching the equipment, making adjustments to the flow valve as necessary, and taking the required readings, the workers' vigilance is often compromised by the inhospitable conditions outlined above. Even under optimal conditions, maintaining a constant flow by manual means is nearly impossible under rapidly changing water levels. The result is a scattering of data points and inaccurate findings relative to the capacity and characteristics of the well source.

After testing is completed and a source of water is adopted as a municipal water well, continued management over the source is statutorily mandated. That is, municipal water wells are restricted by state regulations as to the quantity of water that can be withdrawn from municipal aquifers. Simply put, yield from the municipal water well must be controlled.

Proficient management of water resources involves control over pumping rates, associated water level drawdown, and well yield. Currently, although larger municipalities can afford to employ some crude forms of mechanical assistance, most municipalities control water discharge rates and volumes manually. In these manual control systems, an operator must attend to valve control by reading meters and physically adjusting the valve. Response time depends upon the operator's skill and attention, which often is dulled by repetition and tedium. The industry needs a device which can be installed into an existing municipal water well framework to facilitate more efficient use and to improve performance of municipal water well operations.

Another industry concerned with water management is the construction industry. Difficulties are encountered in this field when dewatering of a subsurface is required by earthmoving, excavation, or similar projects. It is important that pumping rate and associated drawdown and yield are carefully monitored during these operations. If drawdown and yield are excessive, the landmass in question could lose buoyancy and fail, resulting in a landslide. Construction engineers do not presently have the capability to easily and accurately monitor or control the drawdown and measure the yield from embankments located in remote areas.

Additionally, water management is necessary in the field of groundwater pump and treat remediation projects. The objective of such projects is to direct the groundwater flow path of contaminated groundwater to a collection point for removal. The drawdown at the collection point must be maintained. If pumping ceases and drawdown is not maintained, the flow path reverts to its natural path, allowing contaminants to escape collection. Presently, remediation pumps shut off when drawdown exceeds the depth of the pump, leaving the groundwater free to revert to its natural path. A need exists in this field to control operational parameters such that drawdown can be maintained and the groundwater flow path can be controlled or otherwise sustained.

A comprehensive solution is needed to solve the aforementioned difficulties. One that is easy to deploy, operate, and maintain. One which can perform in remote locations, at developed sites, or within existing municipal water well frameworks. One that can serve the various needs of numerous industries.

BRIEF SUMMARY OF THE INVENTION

In accordance with the present invention a well tender comprises control equipment, testing equipment, and communication equipment providing an apparatus and method to remotely control, monitor, record, and transmit operational parameters during an aquifer test, municipal well operation, dewatering project, pump and treat remediation project, or similar activity.

Objects and Advantages

Accordingly, the objects and advantages of the invention are:

A) to provide a method to monitor, control, record, and transmit operational parameters of an aquifer test, municipal well, dewatering project, pump and treat remediation project, or similar activity.

B) to provide an apparatus to monitor, control, record, and transmit operational parameters of an aquifer test, municipal well, dewatering project, pump and treat remediation project, or similar activity.

C) to provide a remotely controlled monitoring apparatus and method that can be used to test an aquifer, operate a municipal well, oversee a dewatering project, direct groundwater flow in a pump and treat remediation project, or manage a similar activity.

D) to provide an apparatus and method that can be accessed by on-site or remote personnel, who may adjust the operational characteristics thereof as desired.

E) to provide a mobile, or permanent, sheltered apparatus and method from which data relative to an aquifer test, dewatering project, pump and treat remediation project, or similar activity can be collected without subjecting workers to inhospitable conditions usually encountered while exposed to natural elements.

F) to provide a mobile, or permanent, remote monitoring apparatus and method that can be used in an aquifer test, municipal well, dewatering project, pump and treat remediation project, or similar activity, record the parameters thereof, and transmit data generated therefrom to a designated receiver.

G) to provide a mobile, or permanent, remote monitoring apparatus and method that can detect problems with the equipment being used, the subject matter being tested, or other components associated therewith and transmit a warning and/or error message to a designated receiver.

H) to provide a mobile, or permanent, remote monitoring apparatus and method that can detect a problem with the equipment being used, the subject matter being tested, or other components associated therewith and take appropriate steps to solve the problem in a way that limits the negative consequences of the problem.

I) to provide a mobile, remote monitoring apparatus and method that is easy to set-up, use, remove, and then use again at another location.

J) to provide a mobile, or permanent, remote monitoring apparatus and method that may be remotely accessed by an operator who may then monitor, control, or otherwise interface with same.

K) to provide a mobile, or permanent, remote monitoring apparatus and method that collects data relative to the parameters of a well or water source with greater accuracy and convenience than current techniques allow.

L) to provide a mobile, or permanent, remote monitoring apparatus and method that transmits data to multiple locations.

M) to provide a mobile, or permanent, remote monitoring apparatus and method that can control, monitor, and facilitate on-site and off-site supervision of pumping activities relative to an aquifer test, municipal water well, dewatering operation, pump and treat remediation project, or similar activity.

N) to provide a apparatus and method capable of being operated with existing municipal equipment and within the confines of existing municipal frameworks such that parameters of a municipal water well can be controlled, monitored, and recorded.

O) to provide a mobile, remote monitoring apparatus and method to reduce the likelihood of landmass failure and/or landslide through accurate measurement and control of pumping rate and associated drawdown and yield.

P) to provide a mobile, or permanent, remote monitoring apparatus and method to control operational parameters of a well such that drawdown can be maintained and the groundwater flow path can be controlled during pump and treat remediation projects.

Further objects and advantages are to provide an effective means to manage, control, monitor, or otherwise oversee the operational parameters associated with a well or with well pumping activities. Still further objects and advantages will become apparent from consideration of the ensuing description and drawings.

BRIEF DESCRIPTION OF THE DRAWINGS

FIG. 1 shows a side view of an embodiment of the invention as a trailer with the exterior wall removed, allowing observation of interior components.

FIG. 2 shows a rear view of an embodiment of the invention as a trailer with interior components represented by hidden lines.

FIG. 3 shows a top view of an embodiment of the invention as a trailer with the roof removed, allowing observation of interior components.

FIG. 5A is a plan view of the invention in working position.

FIG. 5B shows the control system and data flow.

REFERENCE NUMERALS IN DRAWINGS

Figure 4:
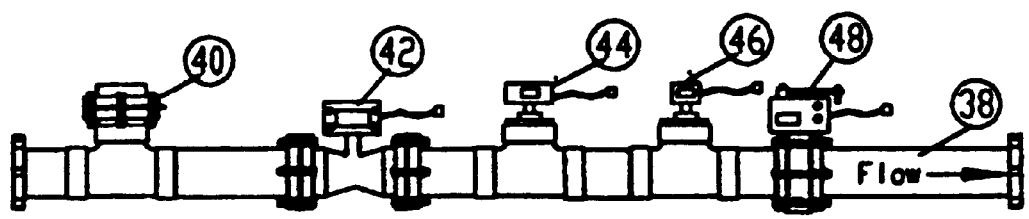
FIG. 4 shows an embodiment of the flow measurement/control assembly as incorporated by the invention.

20 Trailer
22 Control Panel
24 Autodialer
26 Programmable Logic Controller (PLC)
28 Cellular Telephone and Modem Interface
30 Roof Vent
32 Supervisory/Control and Data Acquisition Computer (SCADA)

34 Flow Control/Monitoring/Data Acquisition Software
36 Computer Desk/Mounting
38 Flow Measurement/Control Assembly (FMCA)
40 Pressure Relief Valve/Switch
42 Flow Gauge/Transmitter
44 Temperature Sensor
46 Specific Conductivity Sensor
48 Linear Actuated Flow Control Valve
50 Flow Measurement/Control Assembly Signal/Power Junction Box
52 Trailer Power Feed Junction Box
54 Pressure Transducer
56 Electrical Power Source/Power Generator
58 Pump
60 Sensor cable
62 Power cable
64 Electrical current sensor
66 Oil temperature sensor
68 Fuel sensor

DETAILED DESCRIPTION OF INVENTION

The following illustrates a preferred embodiment of the invention for aquifer or well testing. As shown in FIG. 5A, a trailer 20 is connected via sensor cables 60 from the flow measurement/control assembly signal/power junction box 50 to a flow measurement/control assembly (hereinafter "FMCA") 38, to a down well pressure transducer 54, and to an electrical power source/power generator 56, where connections are made to an electrical current sensor 64, an oil temperature sensor 66, and a fuel sensor 68. Furthermore, the trailer 20 is connected via power cables 62 from a trailer power feed junction box 52 to the power generator 56. A pump 58 is connected to the electrical power source 56 via power cables 62.

As shown in FIGS. 1–3, the trailer 20 houses a control panel 22, an autodialer 24, a programmable logic controller (hereinafter "PLC") 26, a cellular telephone and modem interface 28, a supervisory/control and data acquisition (hereinafter "SCADA") computer 32 incorporating the flow control/monitoring/data acquisition software 34, and a computer desk/mounting 36. As shown in FIG. 4, the flow measurement/control assembly 38 contains a pressure relief valve 40, a flow gauge/transmitter 42, a temperature sensor 44, a conductivity sensor 46, and a linear actuated control valve 48.

The system operates via programmed specifications using the flow control/monitoring/data acquisition software 34 or operator input to the SCADA computer 32. The operator input may be made to the computer by on-site personnel or may be input remotely via the cellular telephone and modem interface 28.

The pump 58 is used to bring water up and out of the well. As water rises from the well, the down well pressure transducer 54 monitors down well conditions and sends this information to the SCADA computer 32 for processing and storage. As shown in FIG. 5A, water flows from the well, through the pump 58, and into the FMCA 38, which houses sensors to monitor parameters comprising pressure 40, flow rate 42, temperature 44, and specific conductivity 46 of the water. As shown in FIG. 5B, signals from the sensors are sent to the SCADA computer 32 for processing and storage. The SCADA computer 32, utilizing the PLC 26 and flow control/monitoring/data acquisition software 34, uses this information to adjust the linear actuated control valve 40 so that flow rate remains as constant as possible for the duration of the test; and, advantageously uses the flow rate 42 and down well transducer 54 information to determine the drawdown, well yield, and specific capacity of the well. The operational parameters of the power generator 56, including oil temperature, fuel level, and electrical current, are also transmitted from sensors on the generator to the SCADA computer 32.

Figure 6:
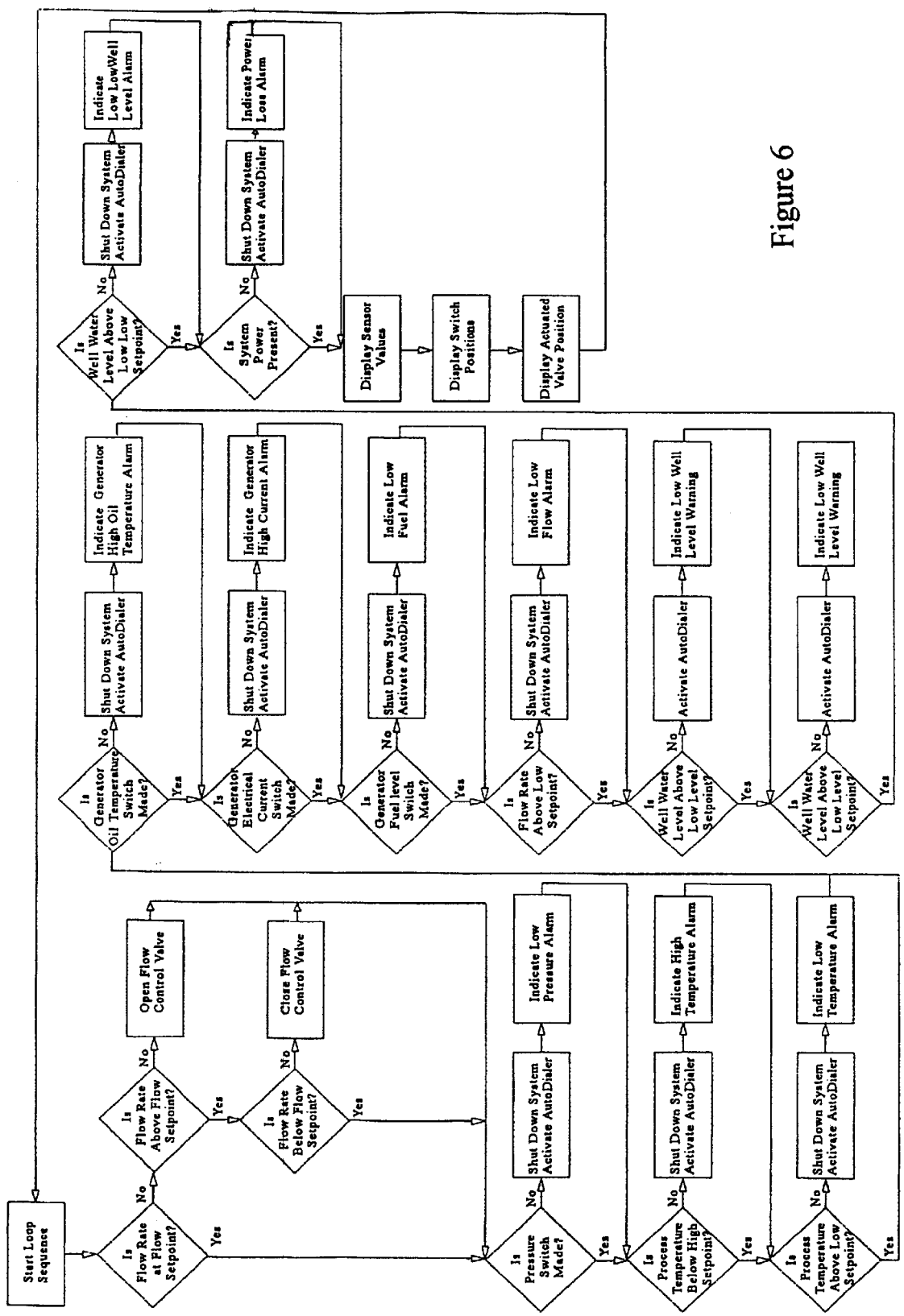
FIG. 6 is a flowchart illustrating the flow control/monitoring/data acquisition software.

If the SCADA computer 32 detects a discrepancy or failure from the sensor readings, the SCADA computer will employ the cellular telephone and modem interface 28 and autodialer 24 to notify/call a previously specified off-site device or person, will alert the personnel on-site, will alter operational parameters as shown in FIG. 6 utilizing the PLC 26 and flow control/monitoring/data acquisition software 34, or will adjust operational parameters as instructed by on-site or off-site personnel. After passing through the FMCA 38, the well water is discharged to a nearby stream or trash basin.

Alternative Embodiments

While the above description contains many specificities, these should not be construed as limitations on the scope of the invention, but rather as an exemplification of one preferred embodiment thereof. Many variations are possible and some are as follows.

First, the electrical cable connections in the preferred embodiment may be made via infrared or radio transmission as opposed to the cable connections described. That is, the sensors may be linked, via wireless connections, to the SCADA computer 32, which may itself be linked, via wireless connections, to a designated device, be it local or distant. Second, although a generator is indicated in the preferred embodiment, alternative sources of electrical power may be implemented to supply needed electricity. If a generator is not employed, the operational characteristics of oil temperature and fuel level need not be monitored. Third, the SCADA computer 32 may be wall mounted, desk mounted (as illustrated by computer desk 36 in FIG. 3), or be portable (as illustrated in FIG. 5B). Fourth, sensor readings can be included or omitted as situations require. For instance, if conductivity is deemed unimportant to an operation, the conductivity sensor may be excluded or simply switched off. Sensors which may be included to measure additional water quality parameters include, but are not limited to, sensors for pH, dissolved oxygen, color, and turbidity.

In addition, to facilitate installation of the FMCA and its connection to the SCADA computer, two pre-wired junction boxes may be implemented. That is, the sensors on the FMCA transmit data via hard-wired connections to a signal junction box, which is attached by a single cable to a second junction box. The second junction box is hard-wired to the control panel, which is connected to the SCADA computer and Autodialer. This embodiment is illustrated in FIG. 5B.

As mentioned in the Detailed Description of the Invention, if the SCADA computer 32 detects a discrepancy or failure from the sensor readings, the SCADA computer 32 will employ the cellular telephone and modem interface 28 and autodialer 24 to notify/call a previously specified off-site device. The specified device may include, but is not limited to, a computer, a fax machine, a printer, a pager, a telephone, a or any other similar device or means capable of such reception. This is illustrated in FIG. 5B.

Moreover, the invention may be modified to fit the needs of a given industry. Slight alterations make the invention amenable to use in municipal wells, construction site operations, and pump and treat remediation projects.

Because municipal well management does not require a high degree of mobility, the wheeled trailer may be replaced with a table, shelf, desk, or similar platform to serve in place of the trailer, and the apparatus can be installed permanently onto existing municipal frameworks. That is, the FMCA may be connected along the transmission line of existing municipal wells instead of being connected to the discharge port of the pump as is done in the aquifer testing embodiment.

Because water quality measurements are not very important in construction site operations, especially in dewatering projects, the FMCA need not include all the water quality sensors indicated above. The only sensors needed are those for valve control, flow measurement, pressure measurement, and temperature measurement.

Pump and treat remediation often involves contact with corrosive agents. Because the pressure transducer cable will be submerged in corrosive agents, the cable will require a coating of a corrosion resistant substance, PTFE for instance, or another similarly resistant substance.

Additionally, pump and treat remediation involves low flow rates. In order to accommodate this low flow, a smaller diameter pipe is needed for the FMCA. This diameter may be between one and two inches, allowing five to fifty gallons of water to flow through the FMCA per minute. Thus, the groundwater flow path can be maintained even if flow rates are low.

The embodiments above-discussed are to be considered illustrative and not restrictive. Thus, the scope of the invention should be determined by the appended claims and their legal equivalents.

Conclusions, Ramifications, and Scope

The utility of the well tender is apparent. Technical and operating personnel can set-up the invention and begin testing faster than current methods allow. Embodiments of the invention can be mobile, allowing easy transport to remote locations. Connections from the sensors to the flow measurement/control assembly signal/power connection box are few and simple. Sensor information is gathered, stored, and processed by the SCADA computer, which displays this information on a monitor for convenient observation. Furthermore, the control panel contains indicator lights to aid the quick observation of potential operational discrepancies.

Technical and operating personnel are able to withstand harsh on-site environmental conditions by taking shelter within the trailer. Moreover, technical and operating personnel need not stay on-site at all because the invention can transmit its data to whatever location the technical and operating personnel designate. That is, the invention can receive instructions from any location via the cellular telephone and modem interface, eliminating the necessity of keeping onsite personnel present while operating the invention.

Discrepancies or failures detected through the sensor readings will be recognized and possible damage to the machinery, operators, or the environment will be averted through automated notification and adjustment procedures directed by the SCADA computer. Depending upon the nature of the problem, the computer will notify the on-site personnel, notify off-site personnel at designated locations, will adjust the operational parameters as illustrated in FIG. 6, or will shutdown the operation completely.

Data collected is more accurate than current methods allow due to the responsiveness of computer control over the water flow rate and the overall processing capabilities of the SCADA computer and flow control/monitoring/data acquisition software. As such, it will be easier for personnel to test the performance of a well or aquifer, to monitor and control yield from an existing municipal well, to discern possible landmass failure during a dewatering operation, to direct the groundwater flow path of contaminated groundwater to a collection point for removal, and to manage operational parameters associated with similar well pumping activities.

The above-discussion is to be considered illustrative and not restrictive. Thus, the scope of the invention should be determined by the appended claims and their legal equivalents.

I claim:

1. A well tender for controlling and monitoring water flow from a source of water, comprising:
   a. first means for drawing and directing water from a water source,
   b. second means for coupling sensors to said first means,
   c. third means for receiving and transmitting signals generated by said sensors to and from a computer processor means,
   d. said computer processor means for processing data generated by said sensors,
   e. fourth means for adjusting, controlling, or altering operational parameters based on the data collected from said sensors using programmed instructions or using input from on-site or off-site personnel entered into said computer processor means,
   f. fifth means for allowing transmission of data to designated locations and for reception of off-site instructions for adjusting, altering, or controlling operational parameters, and
   g. sixth means for providing a source of electricity on which source sensors are attached to take oil temperature, fuel level, and electrical current measurements, which are sent to said computer processor means.

2. The well tender of claim 1 in which the first means for drawing water from a water source utilizes existing municipal water transmission means.

3. The well tender of claim 1 in which the first means for drawing and directing water from a water source is a length of pipe which serves as a Flow Measurement/Control Assembly, which comprises a pressure relief valve followed in series by a flow gauge transmitter, a temperature sensor, and a linear actuated flow control valve, allowing water flow to be adjusted to full open valve position, full closed valve position, or any position between full open and full closed.

4. The well tender of claim 1 in which the third means for receiving and transmitting signals generated by said sensors to and from said computer processor means includes electrical cables, infra-red transmission means, radio transmission means, or wireless transmission means connecting said sensors to said computer processor means.

5. The well tender of claim 1 in which said fourth means for adjusting, controlling, or altering operational parameters based on the data collected from said sensors using programmed instructions or using input from on-site or off-site technicians entered in said computer processor means is accomplished using a Supervisory/Control and Data Acquisition Computer and integrated Flow Control/Monitoring/ Data Acquisition Software such that adjusting, controlling, or altering operational parameters is accomplished by:
   a. actuating a water flow control means, which can be adjusted to full open position, full closed position, or any position between full open and full closed, b. shutting down the well tender in full or in part, or c. activating said fifth means for allowing transmission of data to designated locations and for reception of off-site instructions for adjusting, controlling, or altering operational parameters.

6. The well tender of claim 1, further including a body carriage having rotatable wheels mounted thereunder, enabling said carriage to roll over a surface; a sheltered platform mounted to said carriage, enabling on-site personnel protection from inhospitable weather conditions; said computer processor means located or mounted within said sheltered platform; and said means for allowing transmission of data to designated locations and for reception of off-site instructions located or mounted in or on said sheltered platform.

7. A method for controlling and monitoring water flow from a source of water, comprising the steps of:

a. attaching a length of pipe to a water source, b. directing water from said water source through said length of pipe, c. providing sensors along said length of pipe for taking water quality measurements, d. providing a computing and processing means for:
  i. receiving measurements from said sensors,
  ii. monitoring measurements from said sensors,
  iii. recording, storing, and processing measurements collected from said sensors,
  iv. controlling, adjusting, or altering operational parameters based on the measurements collected from said sensors using programmed instructions or using input from on-site or off-site technicians, e. providing a wireless communication and interface means for:
  i. transmitting said measurements to specified locations and corresponding devices,
  ii. receiving off-site instructions for adjusting, controlling, or altering operational parameters, f. providing a source of electrical power for generating, supplying, or transferring electricity, and g. providing sensors to measure electric current, fuel level, or oil temperature in or from the source of electrical power and sending these measurement to said computing and processing means, whereby the maximum sustainable flow rate from a water source is determined, and the yield and drawdown of the water source are controlled, monitored, and recorded.

8. The method of claim 7 in which the attachment of the length of pipe to the water source is accomplished using an existing municipal water transmission means.

9. The method of claim 7 in which the direction of water from said water source is through a length of pipe which serves as a Flow Measurement/Control Assembly, which comprises a pressure relief valve followed in series by a flow gauge transmitter, a temperature sensor, and a linear actuated flow control valve, allowing water flow to be adjusted to full open valve position, full closed valve position, or any position between full open and full closed.

10. The method of claim 7 in which receiving and transmitting signals generated by said sensors to and from said computer processor means is accomplished via electrical cables, infra-red transmission means, radio transmission means, or wireless transmission means connecting said sensors to said computer processor means.

11. The method of claim 7 in which the step of adjusting, controlling, or altering operational parameters is accomplished by:

a. actuating a water flow control means, which can be adjusted to fill open position, full closed position, or any position between full open and fill closed, b. shutting down the well tender in full or in part, or c. activating said fifth means for allowing transmission of data to designated locations and for reception of off-site instructions for adjusting, controlling, or altering operational parameters.

* * * * *